(12) United States Patent
Khan et al.

(10) Patent No.: US 9,619,167 B2
(45) Date of Patent: Apr. 11, 2017

(54) SYSTEM AND METHOD FOR COMPUTING MESSAGE DIGESTS

(71) Applicant: Intel Corporation, Santa Clara, CA (US)

(72) Inventors: Jawad B. Khan, Cornelius, OR (US); Knut S. Grimsrud, Forest Grove, OR (US); Richard L. Coulson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 14/091,598

(22) Filed: Nov. 27, 2013

(65) Prior Publication Data

US 2015/0149695 A1 May 28, 2015

(51) Int. Cl.
*G06F 3/06* (2006.01)
*G06F 17/30* (2006.01)

(52) U.S. Cl.
CPC ............ *G06F 3/0641* (2013.01); *G06F 3/061* (2013.01); *G06F 3/0626* (2013.01); *G06F 3/0658* (2013.01); *G06F 3/0659* (2013.01); *G06F 3/0688* (2013.01); *G06F 17/30109* (2013.01); *G06F 2003/0697* (2013.01); *G06F 2212/402* (2013.01)

(58) Field of Classification Search
None
See application file for complete search history.

(56) References Cited

U.S. PATENT DOCUMENTS

| 8,504,830 B2 | 8/2013 | Ishii et al. |
| 2007/0288760 A1 | 12/2007 | Euchner et al. |
| 2008/0104162 A1* | 5/2008 | Suzuki .................. H04L 1/0061 708/530 |
| 2011/0055471 A1* | 3/2011 | Thatcher ............... G06F 3/0608 711/114 |

(Continued)

OTHER PUBLICATIONS

International Search Report for PCT/US2014/061533, dated Mar. 12, 2015, 4 pages.

*Primary Examiner* — Kaushikkumar Patel
(74) *Attorney, Agent, or Firm* — Chapin Intellectual Property Law, LLC

(57) ABSTRACT

A data de-duplication approach leverages acceleration hardware in SSDs for performing digest computations used in de-duplication operations and support on behalf of an attached host, thereby relieving the host from the computing burden of the digest computation in de-duplication (de-dupe) processing. De-dupe processing typically involve computation and comparison of message digests (MD) and/or hash functions. Such MD functions are often also employed for cryptographic operations such as encryption and authentication. Often, SSDs include onboard hardware accelerators for MD functions associated with security features of the SSDs. However, the hardware accelerators may also be invoked for computing a message digest result and returning the result to the host, effectively offloading the burden of MD computation from the host, similar to an external hardware accelerator, but without redirecting the data since the digest computation is performed on a data stream passing through the SSD for storage.

17 Claims, 5 Drawing Sheets

(56) References Cited

U.S. PATENT DOCUMENTS

| | | | |
|---|---|---|---|
| 2011/0246741 A1* | 10/2011 | Raymond | G06F 17/30159 |
| | | | 711/170 |
| 2012/0197901 A1 | 8/2012 | Wilson | |
| 2012/0260021 A1* | 10/2012 | Rudelic | G06F 3/0641 |
| | | | 711/103 |
| 2013/0080403 A1 | 3/2013 | Yamakawa | |
| 2013/0218851 A1 | 8/2013 | Yamakawa | |
| 2013/0238876 A1* | 9/2013 | Fiske | G06F 3/0641 |
| | | | 711/216 |
| 2014/0040698 A1* | 2/2014 | Loh | G06F 13/1668 |
| | | | 714/758 |
| 2015/0032938 A1* | 1/2015 | Salessi | G06F 12/0246 |
| | | | 711/103 |

\* cited by examiner

SYSTEM AND METHOD FOR COMPUTING MESSAGE DIGESTS

BACKGROUND

A solid state disk (SSD) is a high performance storage device that contains no moving parts. SSDs are much faster than typical hard disk drives (HDD) with conventional rotating magnetic media, and typically include a controller to manage data storage. The controller manages operations of the SSD, including data storage and access as well as communication between the SSD and a host device. Data de-duplication is the mechanism whereby duplicates of any given set of data are identified and cross-referenced, and only unique data patterns are written to the storage medium and all the duplicates are captured as pointers to the unique data sets, typically blocks. If there is duplication in the data stream, this technique allows the system to drastically reduce the amount of data written to the drive.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
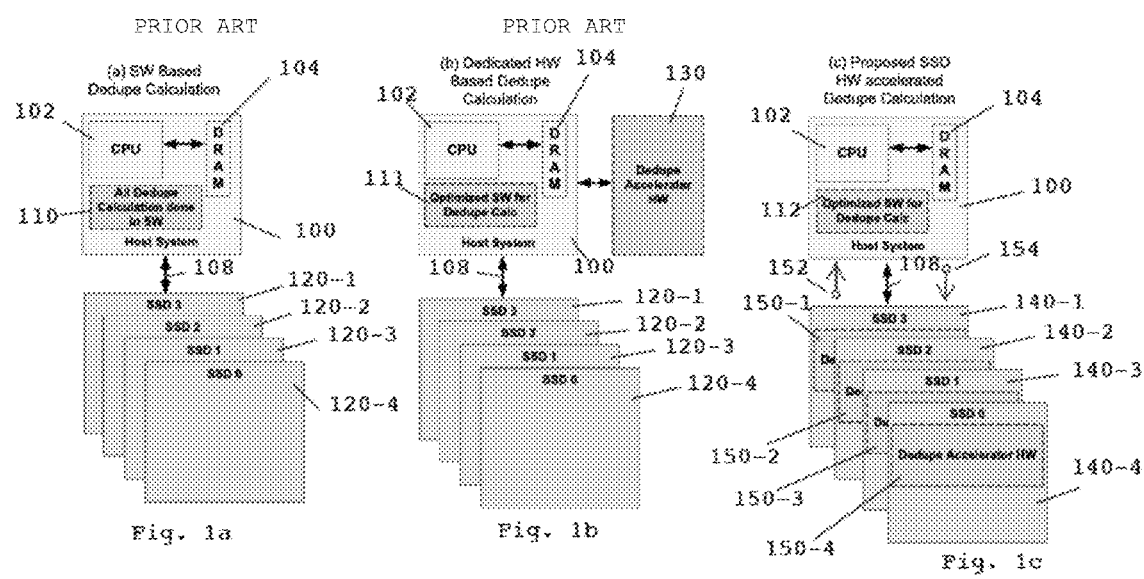
FIG. 1a-1c show a context of implementation options for message digest computation.

A data de-duplication approach leverages acceleration hardware in mass storage devices such as HDDs and SSDs for performing de-duplication operations and support on behalf of an attached host, thereby relieving the host from the computing burden of the hash digest computations for the de-duplication (de-dupe) processing. De-dupe processing typically involve computation and comparison of message digests (MDs) and/or hash functions. MD functions are applied to an original data item to generate a smaller but unique identifier such that any change to the data will change the digest value, and are often also employed for cryptographic operations such as encryption and authentication. Often, SSDs include onboard hardware accelerators for MD functions associated with security features of the SSDs. However, the hardware accelerators may also be invoked for computing a digest (MD) result and returning the result to the host, effectively offloading the burden of MD computation from the host, similar to an external hardware accelerator, but without redirecting the data since the digest computation is performed on a data stream passing through the SSD for storage.

Configurations herein are based, in part, on the observation that message digest and hash operations tend to be computationally intensive, and can require substantial CPU cycles for large amounts of data. Unfortunately, conventional approaches to de-dupe operations suffer from the shortcoming that they require additional overhead for MD computations on the host, or require invocation of expensive hardware engines that redirect the data, further hindering performance and increasing cost. However, the on-board hardware accelerators disposed in modern SSDs may not be completely utilized by native security operations of the SSD, and the capability of the SSD hardware accelerators may be invoked by the host for MD computation. Accordingly, configurations disclosed herein substantially overcome the above described shortcomings by invoking the hardware accelerators on-board the SSD for receiving message digest requests from the host and returning the hash/digest results to the host.

The disclosed approach proposes a method for accelerating data de-duplication (a form of data compression) by accelerating the compute intensive operation of hash digest computation, on the SSD itself. The SSD architecture and design offers a unique opportunity for accelerating the digest computation in hardware due to the flow-through, state-less nature of hash digest computations. In the proposed approach, as the data flows through the SSD, the SSD computes the digests and sends them back to the host for the de-dupe digest matching, providing cost efficient, high performance and power efficient de-dupe support. As a part of the full disk encryption system, the SSD already has native HW engines available, for example Advanced Encryption Standard (AES) encryption/decryption and SHA-256 digest computation. The SSD already performs data transformations such as AES encryption/decryption as data flows through it. Adding flow through computation of the SHA digests, therefore, incurs only a modest incremental cost because in most design the HW acceleration engines for digest computation are already available in the SSD controller. Two different data path implementation configurations for computing digests are disclosed, including in-line and offline digest computation methods. These can be used individually or in conjunction with each other.

Configurations disclosed herein compute the digests in the SSD. This approach mitigates latencies since the data is fed in parallel to a dedicated HW acceleration engine. This approach is also power efficient since the data is not sent to system Dynamic random-access memory (DRAM) or to a dedicated acceleration HW engine which are both prone to use more power to complete the same operation. The approach offloads host Central Processing Unit (CPU) computation of digests and allows digest computation to be distributed across a number of drives in the storage subsystem.

The process of data deduplication involves identifying blocks of data which have identical content. Traditionally message digests are computed using the secure hash algorithms (SHA-256) or other digest computation algorithms. Usually 256 bits or 32 bytes in size or smaller digests are computed for each data block which can vary in length from 512 B to 4096 B or more. By comparing the digests, one can easily determine whether a block is identical to another block or not.

In conventional approaches, as discussed above, the data de-duplication systems may be entirely SW based, where the digest computation and comparison with previous digests is done in SW, which tends to burden the host CPU. There are also HW accelerators which can be attached to the storage systems in a data center which perform the digest computation and some portion of the digest comparison in HW, however this approach typically adds substantial expense.

An example architecture of a system using the proposed approach of digest computation on the SSD itself is shown below in FIG. 1c. The digest computation is a stateless, flow-through computation which is particularly well suited to be leveraged on an SSD controller. The SSD controller snoops the data as it is being written and computes the digests in HW for each block passing through it. The computed digests are returned to the host, when the command completes. This architecture is shown in more detail in FIG. 3. Further, there is minimal additional cost for enhancing an SSD controller to enable flow-through digest computation for supporting the disclosed approach.

FIG. 1a-1c show a context of implementation options for message digest computation. Referring to FIG. 1a-1c, FIG. 1a shows a conventional approach to duplication detection (de-dupe) using message digests. In FIG. 1a, a host system 100 has a CPU 102 and memory (DRAM) 104 for application execution, and invokes one or more SSDs 120-1 . . . 120-4 (120 generally) for mass storage. The host system 100 employs a de-dupe application or utility 110 for performing de-dupe calculations in software on the host 100, and requests 108 for storage are examined and compared to identify duplication (typically duplicate sectors, pages or blocks). In FIG. 1a, de-dupe detection detracts from overall CPU 102 performance due to the resources required for digest computation and comparison. A software based implementation also generally takes longer to perform than a hardware or firmware based approach.

FIG. 1b shows a host 100 with a dedicated de-dupe hardware peripheral or card 130 invokable from optimized code 111 for redirecting the I/O requests 108 to the dedicated de-dupe hardware 130. The dedicated hardware approach is effective, but requires the expense of an additional hardware element and also requires redirection of the I/O requests 108 for hardware 130 processing.

FIG. 1c shows native de-dupe accelerator hardware 150-1 . . . 150-4 in the SSD. Referring to FIG. 1c, in contrast to conventional approaches, configurations disclosed herein employ acceleration hardware disposed on an SSD already employed by the host 100 for I/O requests 108. SSDs often employ specialized hardware for security and/or encryption operations for data stored thereon. Rather then occupy host CPU cycles, or redirecting to expensive de-dupe hardware 130, on-board de-dupe accelerator hardware 150-1 . . . 150-4 on the SSD 140-1 . . . 140-4 is invoked. Host de-dupe instructions 112 invoke the accelerator hardware 150 for generating digests, and receive de-dupe digest results 152 in response to requests 154. Further, the accelerator hardware 150 operates on the data stream 108 already passing through the SSD for satisfying host I/O requests, therefore additional fetches and writes for de-dupe operations are avoided. In this manner, de-dupe accelerator hardware 150 is invoked by the host 100 for de-dupe operations that would otherwise burden the host 100 with computation (FIG. 1a) or redirection (FIG. 1b) of the data for de-dupe operations.

Figure 2:
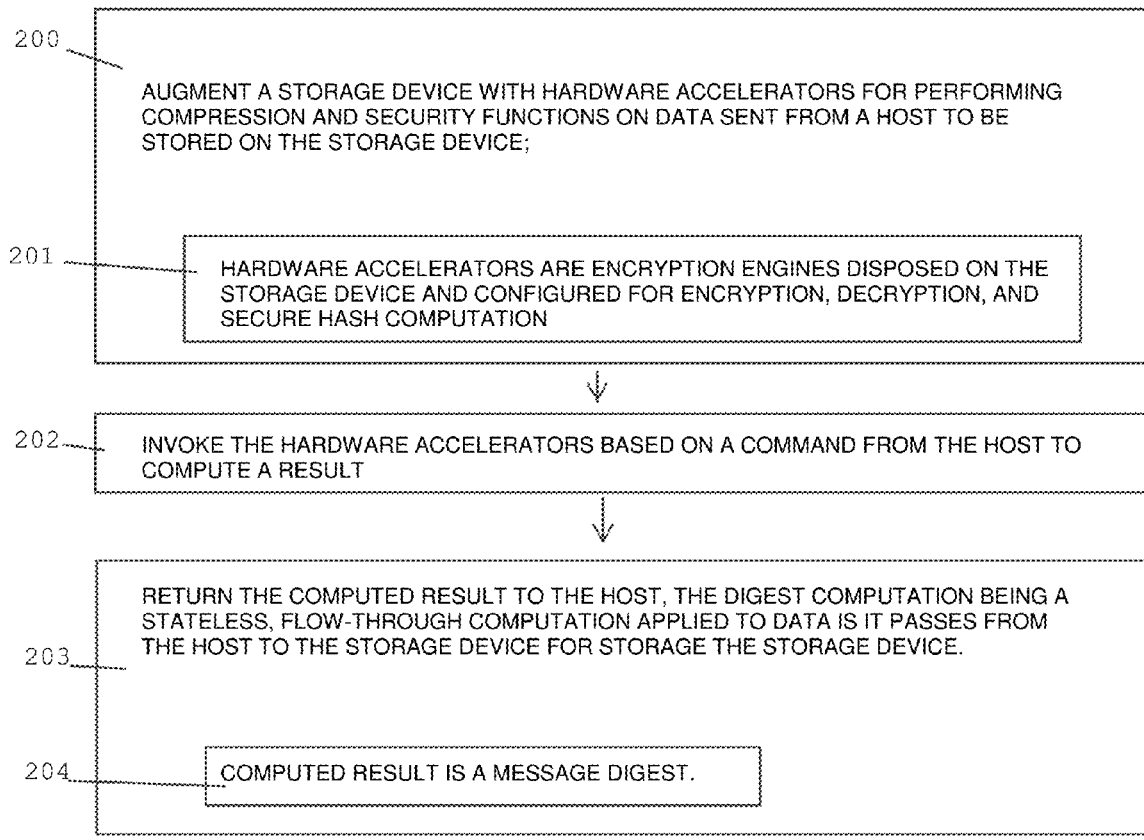
FIG. 2 shows a flowchart of message digest computation as disclosed herein.

FIG. 2 shows a flowchart of message digest computation as disclosed herein. Referring to FIGS. 1c and 2, at step 200, the method of storing data as disclosed herein includes augmenting a storage device, such as the SSD 140, with hardware accelerators 150 for performing compression and security functions on data sent from the host 100 to be stored on the storage device. In the example configuration, the hardware accelerators 150 are encryption engines disposed on the storage device and configured for encryption, decryption, and secure hash computation, as depicted at step 201. Since the hardware accelerators 150 are already designed into the SSDs 140 to support security based encryption and authentication, no additional manufacturing costs need be incurred for de-dupe usage.

The host 100 invokes the hardware accelerators 150 based on a command or request 154 from the host 100 to compute a result 152, as shown at step 202. The SSD 140 returns the computed digest result 152 to the host 100, in which the digest computation is a stateless, flow-through computation applied to data is it passes from the host 100 to the storage device for storage on the storage device, as depicted at step 203. In the example arrangement, the computed result 152 is a message digest, as disclosed at step 204, for comparison with digests of other stored blocks for supporting de-dupe operations.

Figure 3:
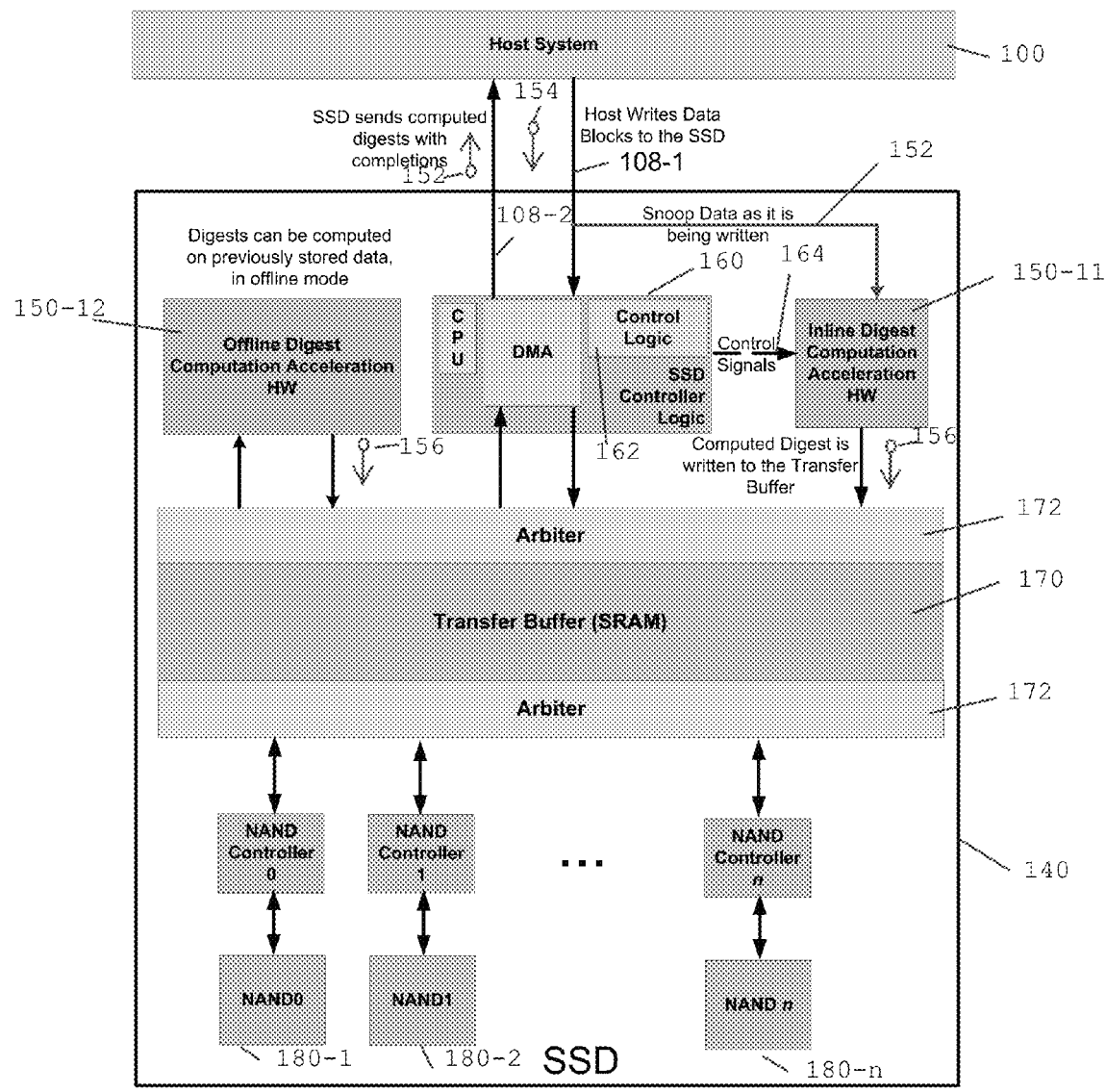
FIG. 3 shows a block diagram of a device for message digest computation as in FIG. 2.

FIG. 3 shows a block diagram of a device for message digest computation as in FIG. 2. Referring to FIGS. 1 and 3, the SSD 140 includes one or more hardware accelerators 150-11, 150-12 (150 generally) native to the SSD and employed for security features in the SSD. However, in addition to these native SSD functions, inline digest computation acceleration hardware 150-11 computes message digests inline by a data sniffer or snoop line 152 that noninvasively reads the write stream 108-1 from the host. The inline, non-intrusive nature avoids a performance impact that would occur with redirecting and/or copying the data to a buffer for separate MD calculations, as shown in FIGS. 1a and 1b above. Offline digest computation acceleration HW 150-12 performs similar digest computation in an offline mode for requests 154 from the host that are voluminous or not urgent. In both cases, MD results 152 are returned to the host 100 responsive to the host request 154, effectively allowing the host 100 to invoke the digest computation capabilities of the SSD 140 without redirecting and/or invoking separate dedicated digest computation hardware 130 since the SSD accelerators 150 have the data stream 108-1 readily available and can perform the digest computation with no or minimal impact to normal SSD throughput.

In the SSD 140, an SSD controller 160 includes SSD control logic 162 responsive to the host requests 154 for sending control signals 164 to the hardware accelerator 150-11. Computed digests 156 are sent to a transfer buffer 170, typically an SRAM that buffers data being stored and retrieved from the SSD 140. An arbiter 172 directs snooped data to a memory medium 180-1 . . . 180-N (180 generally), typically a NAND memory, for storage consistent with an original storage request from the host 100, while the computed digest 152 is sent back to the host 100.

Figure 4:
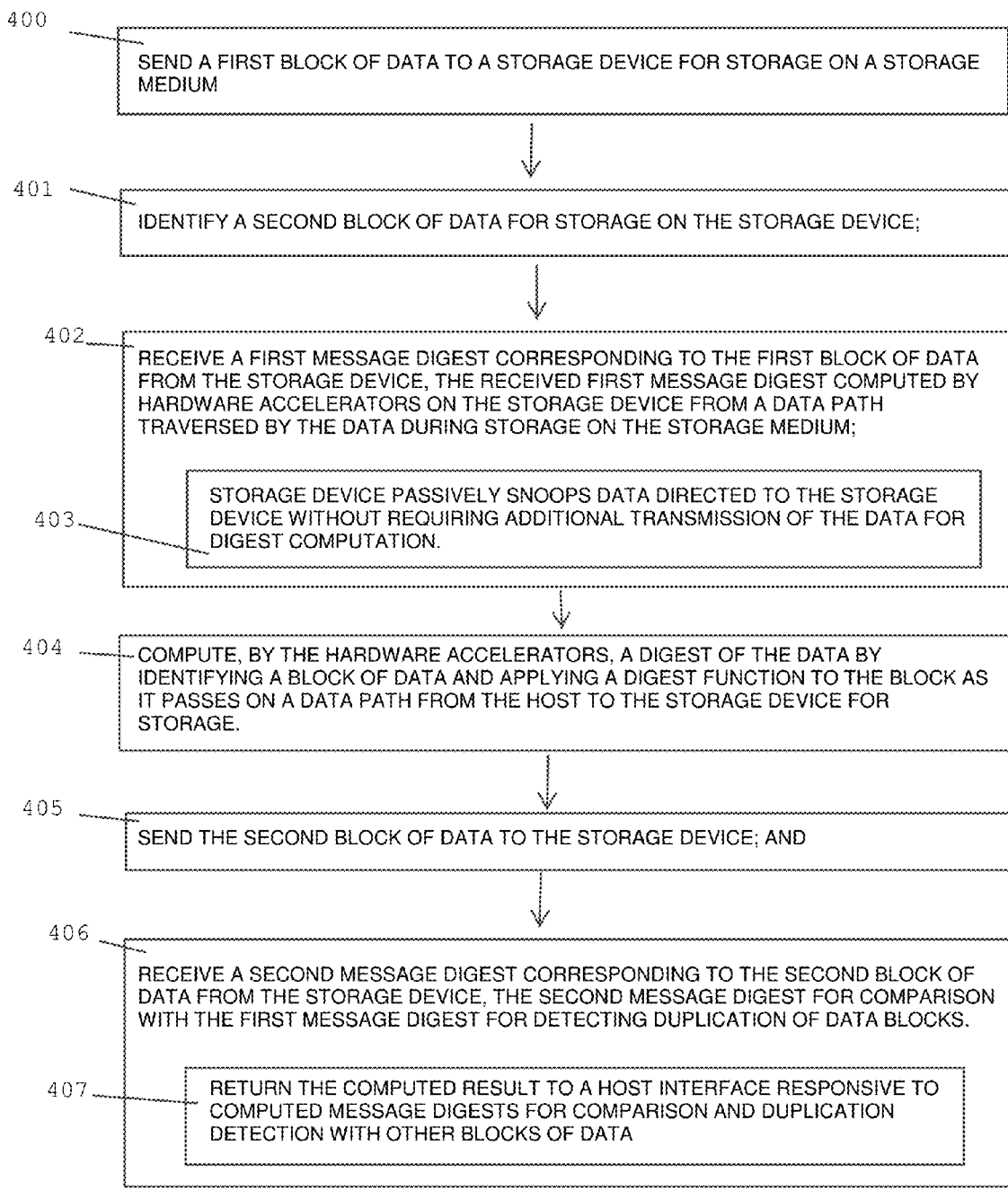
FIG. 4 shows a flowchart of a host side interface for computing a message digest.

FIG. 4 shows a flowchart of a host side interface for computing a message digest. Referring to FIGS. 3 and 4, the host 100 invokes the SSD 140 for performing the digest computation, and receives a result 152 based on a hash (digest) computed as the hashed data passes through the SSD for storage on a storage medium 180 in the SSD 140. The host 100 sends a first block of data to the storage device 140 for storage on the storage medium 180, and identifies a second block of data for storage on the storage device (SSD) 140, as depicted at step 401. In response, the host 100 will receive a first message digest as a response 152 corresponding to the first block of data from the storage device 140, such that the received first message digest is computed by the hardware accelerators 150 on the storage device 140 from a data path 152 traversed by the data during storage on the storage medium 180, as depicted at step 402. The storage device 140 passively snoops data via data path 152, directed to the storage device without requiring additional transmission of the data for digest computation, as shown at step 403.

The hardware accelerators 150 compute a digest of the data by identifying a block of data (or other increment) and applying a digest function to the block as it passes on a data path 108 from the host 100 to the storage device 140 for storage, as shown at step 404. The host 100 sends the second block of data to the storage device 140, as depicted at step 405. The first and second blocks of data need not be consecutive, and may be separated by other storage requests. At a subsequent time, the host 100 receives a second message digest corresponding to the second block of data from the storage device 140, such that the second message digest is for comparison with the first message digest for detecting duplication of data blocks, as depicted at step 406. Detection of duplicate data blocks (de-dupe processing) may occur at any suitable interval, however optimization and tuning parameters will dictate a range of previous blocks likely to contain duplicates, such as per file, per unit time (i.e. a fixed interval, such as N minutes), or other criteria. The storage device 140 returns the computed result 152 to a host 100 interface responsive to computed message digests for comparison and duplication detection with other blocks of data, as disclosed at step 407.

Figure 5:
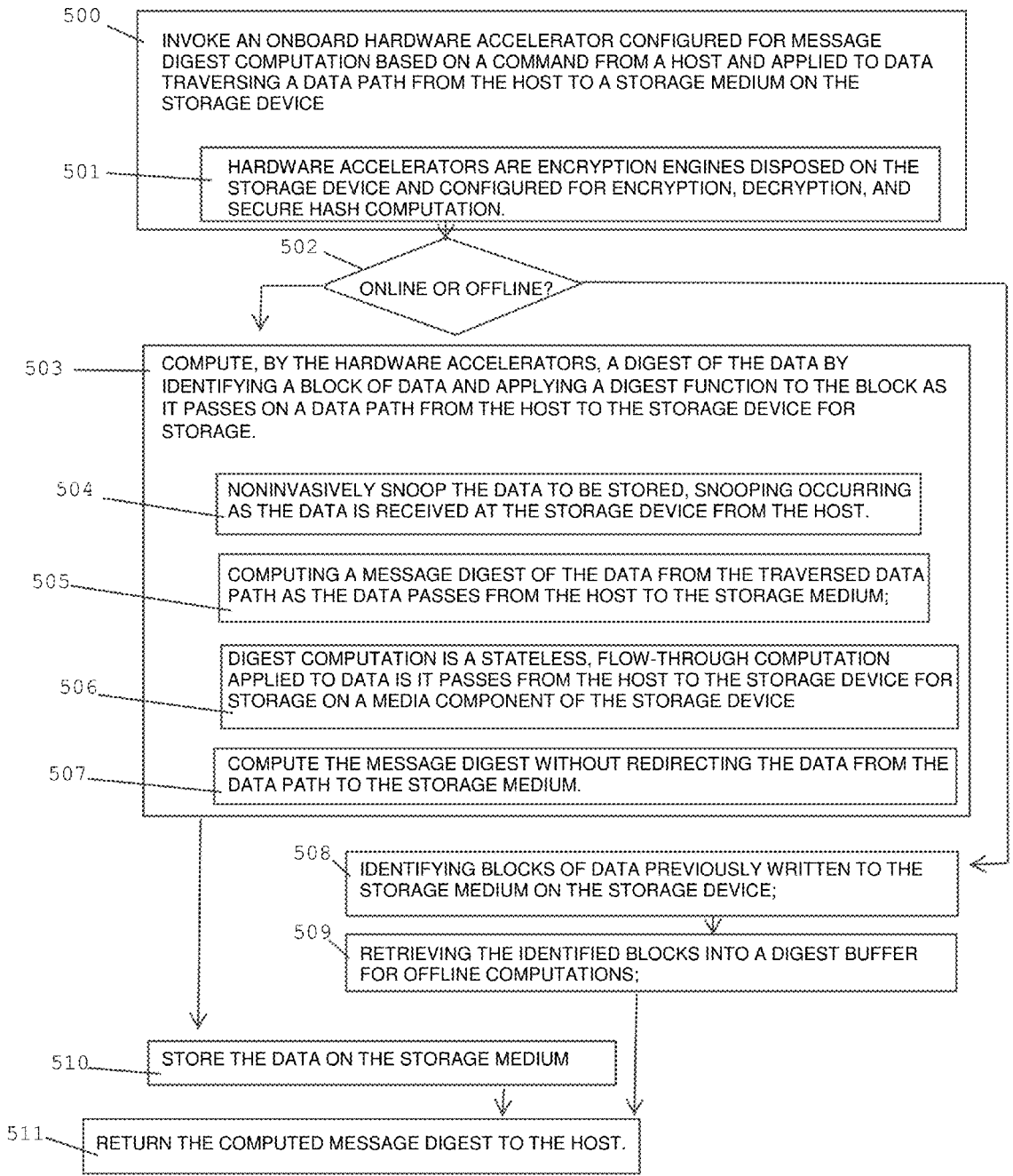
FIG. 5 shows a flowchart of a device side interface for computing a message digest.

FIG. 5 shows a flowchart of a device side interface for computing a message digest. Referring to FIGS. 3 and 5, at step 500, the method of data duplication detection as disclosed herein includes invoking an onboard hardware accelerator 150 configured for message digest computation based on a command or request 154 from a host 100 and applied to data traversing a data path 108-1 from the host 100 to a storage medium 180 on the storage device 140. In the example configuration, the hardware accelerators 150 are encryption engines disposed on the storage device 140 and configured for encryption, decryption, and secure hash computation, as depicted at step 501. A decision is made, at step 502, based on whether the request 154 is for online or offline digest computation. If online digest computation is requested, then the hardware accelerators 140 compute a digest of the data by identifying a block of data and applying a digest function to the block as it passes on a data path 152 from the host 100 to the storage device 140 for storage on the storage medium 180, as depicted at step 503. In the example arrangement, this involves noninvasive snooping of the data to be stored, such that snooping occurs as the data is received at the storage device from the host on data path 108-1, and branched or passively "sniffed" by data line 152 as the data continues unimpeded to storage, as shown at step 504. Therefore, the hardware accelerators 140 compute a message digest of the data from the traversed data path 108-1 as the data passes from the host 100 to the storage medium 180, as depicted at step 505. The digest computation is a stateless, flow-through computation applied to data is it passes from the host 100 to the storage device 140 for storage on a media component, or storage medium 180, of the storage device 140, as disclosed at step 506. This approach avoids latencies associated since the data is fed in parallel to a dedicated HW acceleration engine. This approach is also power efficient since the data is not sent to system DRAM or to a dedicated external acceleration HW engine which are both prone to use more power to complete the same operation. The approach offloads host CPU computation of digests and allows that computation to be distributed across a large number of drives (storage devices 140) in the storage subsystem. The hardware accelerators 150 therefore compute the message digest without redirecting the data from the data path 108-1 to the storage medium 180, but merely snoop or observe the data, as depicted at step 507. The data is then written (concurrently or in any particular order) on the storage medium 180, as depicted at step 510.

If the hardware accelerators 150 are invoked for offline computation, as per the check at step 502, an offline digest computation occurs. In the inline method, the digests are computed as the data is flowing through the SSD for each write operation performed. This is typically the most efficient method of computing the digests. However, the host 100 might request digests for other blocks already present on the SSD for which the request 154 initiates an offline method where the data is read from the medium into a transfer buffer, usually defined by Static Random-Access Memory (SRAM), and the offline engine 150-12 works on this data to compute the digests. After the digests are computed they are sent to the host 100 for digest matching. Offline digest computation therefore includes identifying blocks of data previously written to the storage medium 180 on the storage device 140, as depicted at step 508, and retrieving the identified blocks into a digest buffer for offline computations, as shown at step 509. In either case, the storage device 140 returns the computed message digest to the host 100 as a response 152, as shown at step 511.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of data duplication detection, comprising:
   receiving a write request for a block of data at a storage device coupled to a host for providing non-volatile data storage;
   receiving, from the host, a command to compute a message digest of the block of data in conjunction with fulfilling the write request;
   invoking an onboard hardware accelerator configured for message digest computation based on the command from the host and applied to data in the block of data and traversing a data path from the host to a storage medium in a storage device, wherein the onboard hardware accelerator is an encryption engine disposed on the storage device and configured for encryption, decryption, and secure hash computation;
   duplicating the block of data by snooping the data from a write stream of data to be written to the storage device;

computing, in the onboard hardware accelerator, a message digest of the data, by identifying the block of snooped data and applying a digest function to the block, from the traversed data path as the data passes on the data path from the host to the storage medium in the storage device for storage further comprising noninvasive snooping of the data to be stored, snooping occurring as the data is received at the storage device from the host, wherein the message digest computation is a stateless, flow-through computation applied to data as it passes from the post to the storage device for storage on a media component of the storage device;

storing the data on the storage medium in the storage device; and returning the computed message digest from the onboard hardware accelerator to the host.

2. The method of claim 1 further comprising computing the message digest without redirecting the data from the data path to the storage medium.

3. The method of claim 1 further comprising identifying blocks of data previously written to the storage medium on the storage device;

retrieving the identified blocks into a digest buffer for offline computations;

invoking the hardware accelerators for computing a digest of the buffered data block; and returning the computed digest to the host.

4. The method of claim 1 further comprising snooping the data block after receipt by the storage device from the host.

5. The method of claim 1 wherein the hardware accelerator snoops the data from the write stream as it is being written to the storage medium.

6. The method of claim 1 wherein the hardware accelerator snoops the data as the storage medium is invoked for mass storage.

7. A storage device comprising:

an interface from the storage device to a host device;

an onboard hardware accelerator configured for message digest computation by identification of a block of data and application of a digest function to the block based on a command from the host device and applied to data traversing a data path from the host device to a storage medium on the storage device, wherein the hardware accelerator is an encryption engine disposed on the storage device and configured for encryption, decryption, and secure hash computation;

a solid state storage medium to store the data;

the data path responsive to the hardware accelerators for computing a message digest of the data from the traversed data path as the data passes on the data path from the host to the storage medium for storage; and the interface further configured to provide the computed message digest to the host device, the storage device being a solid state storage device configured to:

receive a write request for a block of data at the solid state storage device coupled to the host device for providing non-volatile data storage;

receive, from the host device, a command to compute a message digest of the block of data in conjunction with fulfilling the write request; and duplicate the block of data by snooping the data from a write stream of data on the data path to be written to the solid state storage medium, further comprising noninvasive snooping of the data to be stored, snooping occurring as the data is received at the storage device from the host, wherein the message digest computation is a stateless, flow-through computation applied to data as it passes from the host to the storage device for storage on a media component of the storage device.

8. The storage device of claim 7 wherein the hardware accelerator is configured for computing the message digest without redirecting the data from the data path to the storage medium.

9. The storage device of claim 8 wherein the hardware accelerator is configured for noninvasive snooping of the data to be stored, snooping occurring as the data is received at the storage device from the host.

10. The storage device of claim 7 wherein the digest computation is a stateless, flow-through computation applied to data is it passes from the host to the storage device for storage on a media component of the storage device.

11. The storage device of claim 7 wherein the hardware accelerator further comprises inline and offline modules, the offline modules configured for:

identifying blocks of data previously written to the storage medium on the storage device;

retrieving the identified blocks into a digest buffer for offline computations;

invoking the hardware accelerators for computing a digest of the buffered data block; and returning the computed digest to the host.

12. A method of storing data comprising:

augmenting a storage device with hardware accelerators for performing compression and security functions on data sent from a host to be stored on the storage device, wherein the hardware accelerators are encryption engines disposed on the storage device and configured for encryption, decryption, and secure hash computation;

receiving a write request for a block of data at a storage device coupled to the host for providing non-volatile data storage;

receiving, from the host, a command to compute a message digest of the block of data in conjunction with fulfilling the write request;

invoking the hardware accelerators based on a command from the host to compute a result by identifying the block of data and applying a digest function to the block as it passes on a data path from the host to the storage device for storage, including duplicating the block of data by snooping the data from a write stream of data on the data path to be written to the storage device, further comprising noninvasive snooping of the data to be stored, snooping occurring as the data is received at the storage device from the host, wherein the message digest computation is a stateless, flow-through computation applied to data is it passes from the host to the storage device for storage on a media component of the storage device; and providing the computed result from the hardware accelerators to the host, the computation being a stateless, flow-through computation applied to data as it passes from the host to the storage device for storage on the storage device.

13. The method of claim 12 wherein computed result comprises a message digest.

14. A computer system comprising:

a solid state storage device (SSD) having a storage medium for storing data;

an onboard hardware accelerator on the SSD configured for message digest computation based on data traversing a data path to a storage medium on the storage device and on a command from a host, the data path responsive to the hardware accelerator to compute a message digest of the data from the traversed data path as the data passes on the data path to the storage medium for storage, wherein the hardware accelerator is an encryption engine disposed on the SSD and configured for encryption, decryption, and secure hash computation; and a host device coupled to the solid state storage device to send data for message digest computation and to receive the computed message digest, the host device having a user interface for displaying the data, the solid state storage device configured to:

receive a write request for a block of data at the solid state storage device coupled to the host device for providing non-volatile data storage;

receive, from the host device, a command to compute a message digest of the block of data in conjunction with fulfilling the write request; and duplicate the block of data by snooping the data from a write stream of data on the data path to be written to the storage device, further comprising noninvasive snooping of the data to be stored, snooping occurring as the data is received at the storage device from the host, wherein the digest computation is a stateless, flow-through computation applied to data as it passes from the host to the storage device for storage on a media component of the storage device.

15. The computer system of claim 14 wherein the SSD is configured to passively snoop data directed to the solid state storage device without requiring additional transmission of the data for digest computation.

16. The computer system of claim 15 further comprising a host interface, the host interface for receiving the computed message digests and responsive to the computed message digests for comparison and duplication detection with other blocks of data.

17. The computer system of claim 14 wherein the hardware accelerators are further configured for computing a digest of the data by identifying a block of data and applying a digest function to the block as it passes on the data path from the host to the solid state storage device for storage.

* * * * *